Patented Jan. 23, 1945

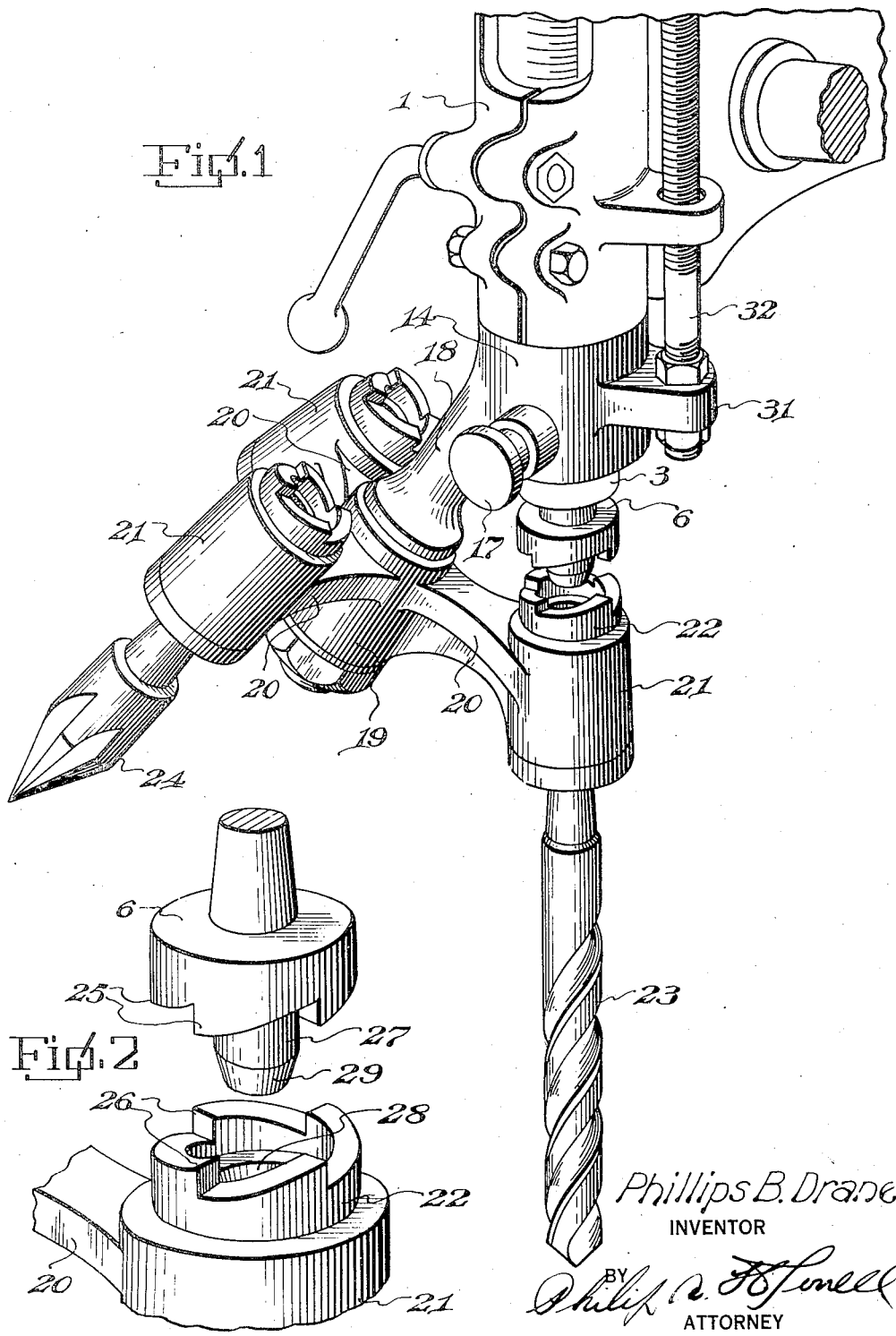

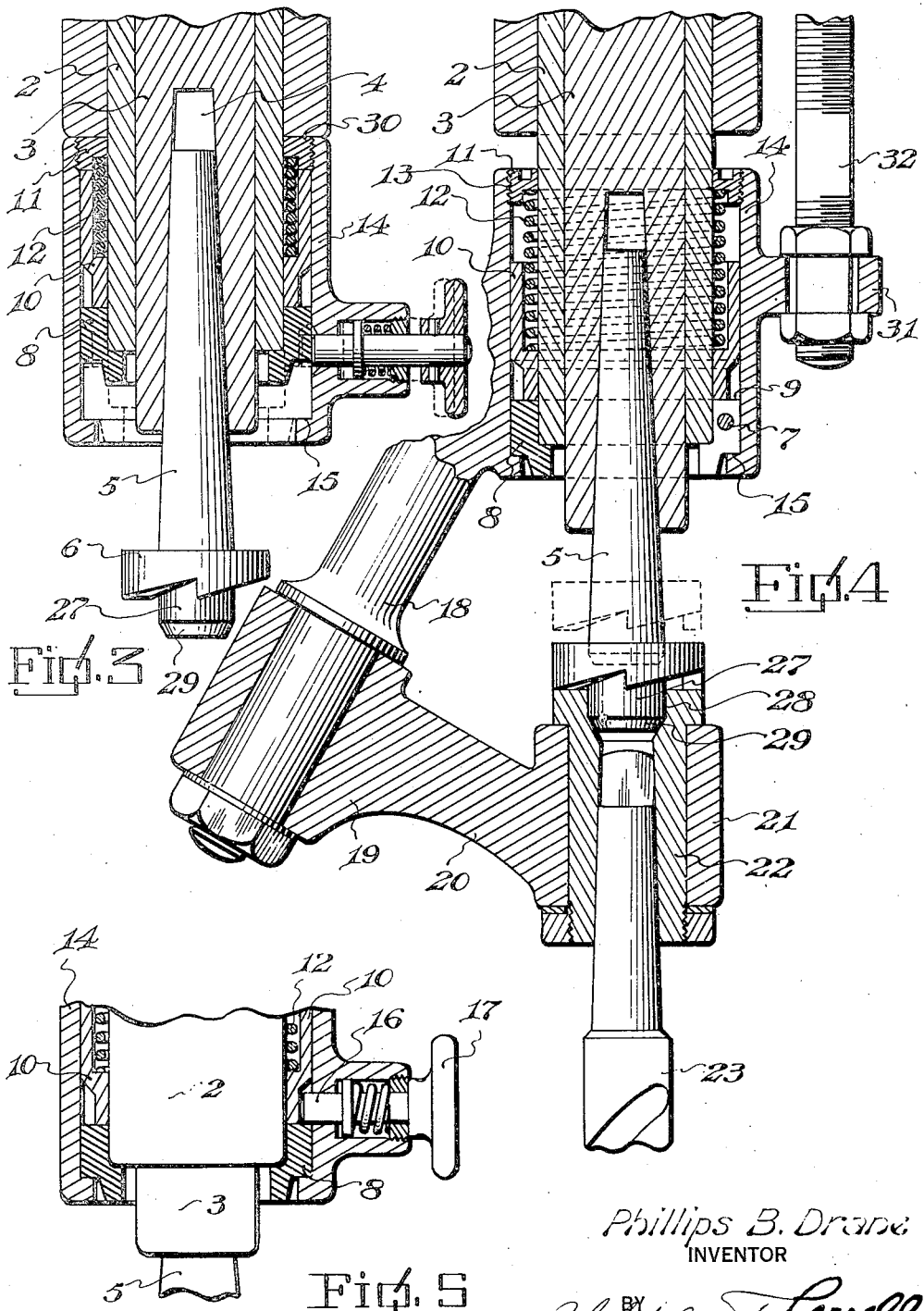

2,368,009

UNITED STATES PATENT OFFICE 2,368,009

TURRET ATTACHMENT FOR DRILL PRESSES

Phillips B. Drane, Tulsa, Okla.

Application January 6, 1943, Serial No. 471,499

2 Claims. (Cl. 77—25)

The invention relates to turret attachments for drill presses, and has for its object to provide a multiple tool holding turret which may be easily and quickly attached to a drill press and so constructed and arranged that various tools may be positioned in axial alinement with the drill press spindle for operation by the drill press.

A further object is to provide a turret attachment for drill presses comprising a bracket which may be attached to the axially movable drill press quill and the bracket arm extending downwardly and outwardly and having rotatably mounted thereon a turret provided with stub spindles for the reception of various tools, and the stub spindles positioned whereby they may be selectively placed in axial alinment with the axis of the drill press spindle for various working purposes.

A further object is to provide expansion spring means in connection with the turret carrying bracket for normally urging said bracket upwardly on the drill, and means mounted on the quill and rigidly secured thereto for holding the spring assembly in position and limiting the downward movement of the quill. A further object is to provide a quill connector detachably mounted within the rotatable spindle within the quill, and adapted to interengage with the upper end of the stub spindle carried by the turret in axial alinement with the axis of the slidable spindle sleeve.

A further object is to provide a manually operated latching device in connection with the turret bracket on the quill for positively holding said quill in lowered position during a drilling operation, and maintaining the interengagement between the sleeve connector and the stub spindle carried by the turret, and which is in position for use.

A further object is to provide a multiple tool turret for drill presses which may be attached to the slidable quill of the press without varying the construction.

A further object is to provide the lower end of the quill with a split ring clamped on the quill in fixed position, a follower above said ring on the quill and with which the lower end of the expansion spring engages and a spanner nut threaded in the upper end of the turret bracket and slidably mounted on the quill and latching means carried by the bracket and cooperating with the split ring for holding said bracket in raised or lowered position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the drill press head showing the multiple tool turret attached thereto.

Figure 2 is a detail perspective view of the quill connector and stub spindle showing the parts in position for interengagement.

Figure 3 is a vertical transverse sectional view through the spindle head, spindle and quill, showing the parts in raised inoperative position.

Figure 4 is a view similar to Figure 3 showing the parts in lowered operative position, the section being taken at a right angle to that shown in Figure 3.

Figure 5 is a view similar to Figure 3, but showing the parts in lowered position and latched against upward movement.

Referring to the drawings, the numeral 1 designates the drill press head of a conventional form of drill press. Axially slidable within the head 1 is a quill 2 and rotatably mounted within the quill 2 is a spindle 3 having a tapered socket 4 for the reception of the tapered shank 5 of the sleeve connector 6. The spindle 3 is rotated by the usual mechanism and all of the above parts are standard equipment in drill presses. It will be understood that applicant does not limit himself to these standard parts, nor to a tapered socket 4, as it is obvious any other shape may be used.

Clamped by means of a take-up bolt 7 on the lower end of the quill 2 is a split ring 8 forming a shoulder 9 on which the lower end of the follower 10 rests. The follower 10 slides upwardly and downwardly on the quill sleeve and interposed between the follower sleeve and a spanner nut 11 is an expansion spring 12. The spanner nut also slides upwardly and downwardly on the quill 2, the purpose of which will presently appear.

The spanner nut 11 is threaded at 13 into the upper end of the angle bracket 14, and the expansion spring normally forces said bracket 14 upwardly, however this upward movement is limited by the engagement of the annular flange 15 with the lower side of the split ring 8, clearly shown in Figure 4. The expansive effect of the spring 12 is to exert upward pressure on the bracket 14 at all times. When the parts are in the position shown in Figures 4 and 5 for a drilling operation, the bracket 14 is held in lowered position by means of a spring actuated plunger or latch 16, which latch engages the upper side of the split ring 8 as shown in Figure 5. The latch is provided with a handle member 17 so it can be released as desired for allowing the expansion spring 12 to raise the bracket 14 to an inoperative position, the purpose of which will presently appear.

Bracket 14 is provided with a downwardly and outwardly extending spindle arm 18, on which arm is rotatably mounted the tool carrying turret 19 having outwardly extending arms 20, terminating in sleeves 21, positioned at an angle wherely the stub spindles 22, rotatably mounted in the sleeves 21, will be in axial alinement with the axis of the rotatable spindle when positioned for use. The stub spindles are adapted to carry a plurality of tools, two being shown for purposes of illustration; one being a drill 23 and the other a countersink 24. After the particular tool has been selected and the turret rotated to the position shown in Figure 1, the bracket 14 is forced downwardly from the position shown in Figure 1 to the position shown in Figures 4 and 5, and then the latch 16 is allowed to move inwardly to a position over the split ring 8. During this operation the bevelled teeth 25, on the sleeve connector 6, interengage with the bevelled teeth 26 on the upper end of the stub spindle 22, which spindle has been selected for use. However, to insure an accurate alinement of the parts during this interengaging operation, as well as disengaging operation the sleeve connector 6 is provided with a guide pin 27, which pin enters the chamber 28 in the upper end of the selected stub spindle 22. The outer end of the guide pin 27 is preferably bevelled as at 29 so that the spindle is axially positioned before the interengagement of the teeth 25 and 26. This interengagement preferably takes place when the spindle 3 is not rotated. After the drilling operation the latch 16 is manually released, the quill 2 raised in the usual manner, and at which time the upper end of the bracket 14 engages the drill press head as shown at 30, Figure 3, thereby compressing the spring 12 and raising the sleeve connector 6 out of interengagement with the stub spindle, and allowing the turret 19 to be rotated for positioning various tools for successive operations.

Extending outwardly from one side of the bracket 14 is a lug 31 to which is connected an upwardly extending depth gauge rod 32, which may control any kind of depth gauge.

From the above it will be seen that a multiple tool turret device is provided for drill presses, which is simple in construction, positive in its operation and one which may be easily attached to drill press quills as now constructed without varying the construction.

The invention having been set forth, what is claimed as new and useful is:

1. A multiple tool turret attachment for drill presses having a rotatable spindle, an axially slidable quill surrounding the spindle, said attachment comprising a stationary bracket surrounding the quill in spaced relation thereto and slidable upwardly and downwardly, means carried by the quill for limiting the upward movement of the bracket, expansion spring means for normally forcing the bracket upwardly, a downwardly and outwardly extending turret receiving arm carried by said bracket, radially disposed and spaced stub spindles carried by said turret and adapted to be axially positioned in relation to the spindle, a sleeve connector detachably carried by the spindle, the lower end of said sleeve connector having interengaging driving connections with the stub spindle in positions for use, a split clamping ring within the turret bracket and carried by the lower end and rigid with the quill, a follower surrounding the quill and engaging the upper side of the split ring, a spanner nut slidably mounted on the quill and threaded into the upper end of the bracket, said expansion spring being interposed between the follower and the spanner nut and normally urging the bracket upwardly, stop means carried by the bracket and cooperating with the split ring for limiting the upward movement of the bracket and means in the path of the bracket and cooperating with the bracket for forcing said bracket downwardly and compressing the spring when said quill is raised.

2. A multiple tool turret support for attaching a turret to a drill press quill, said support comprising a chambered bracket surrounding the quill, a shouldered member carried by the lower end of the quill within the bracket, said shouldered member being in the path of a shoulder carried by the lower end of the bracket for limiting the upward movement of the bracket, a follower member within the bracket, an expansion member interposed between the follower member and the shoulder carried by the upper end of the bracket for normally forcing said bracket upwardly, a latching member carried by the bracket and adapted to latch over the shoulder member carried by the quill for holding said bracket against axial movement and compressing the spring when the quill is extended and stop means within the path of the bracket sleeve for engaging the upper end of the bracket sleeve and compressing the spring when the latching means is released and the quill moves upwardly.

PHILLIPS B. DRANE.